United States Patent [19]

Lichtblau

[11] Patent Number: 4,498,076
[45] Date of Patent: Feb. 5, 1985

[54] RESONANT TAG AND DEACTIVATOR FOR USE IN AN ELECTRONIC SECURITY SYSTEM

[76] Inventor: George J. Lichtblau, 13 Tannery Hill Rd., Ridgefield, Conn. 06877

[21] Appl. No.: 376,777

[22] Filed: May 10, 1982

[51] Int. Cl.³ .............................................. G08B 13/24
[52] U.S. Cl. ................................. 340/572; 343/6.8 R
[58] Field of Search ................... 340/572; 343/6.8 R, 343/6.8 LC

[56] References Cited

U.S. PATENT DOCUMENTS

| | | | |
|---|---|---|---|
| 3,624,631 | 11/1971 | Chomet et al. | 340/572 |
| 3,810,147 | 5/1974 | Lichtblau | 340/572 |
| 3,913,219 | 10/1975 | Lichtblau | 361/402 |
| 3,938,044 | 2/1976 | Lichtblau | 340/572 |
| 3,967,161 | 6/1976 | Lichtblau | 340/572 |

Primary Examiner—Glen R. Swann, III
Attorney, Agent, or Firm—Weingarten, Schurgin, Gagnebin & Hayes

[57] ABSTRACT

A resonant tag circuit having at least one resonant frequency is operative in an electronic security system in which the tag circuit is sensed and electronically deactivated to destroy the resonant characteristics of the tag circuit at the detection frequency. The tag circuit is electronically deactivated by a breakdown mechanism operative within the resonant structure of the tag to cause vaporization of a conductive area or short-circuiting of capacitor plates to destroy the resonant properties of the circuit. A deactivator provides electromagnetic energy at a resonant frequency of the tag circuit of sufficient energy to cause electrical breakdown and deactivation of the tag circuit.

25 Claims, 16 Drawing Figures

RESONANT TAG AND DEACTIVATOR FOR USE IN AN ELECTRONIC SECURITY SYSTEM

FIELD OF THE INVENTION

This invention relates to electronic security systems for the detection of a resonant tag circuit in a controlled area, and more particularly to a tag circuit and apparatus for the electronic deactivation of the tag circuit.

BACKGROUND OF THE INVENTION

Electronic security systems are known for detecting the unauthorized removal of articles from an area under detection. Such systems have been employed especially for use in retail stores to prevent the theft of articles from the store, and in libraries to prevent the theft of books. Such electronic security systems generally include an electromagnetic field which is provided in a controlled area through which articles must pass in leaving the protected premises. A resonant tag circuit is attached to the items, and the presence of the tag circuit in the controlled area is sensed by a receiving system to denote the unauthorized removal of the article. The tag circuit is removed by authorized personnel from an article properly leaving the premises to permit passage of the article through the controlled area without alarm activation.

Systems are also known for the electronic deactivation of a resonant circuit such that the deactivation circuit can remain on the article properly leaving the premises. One such system is shown in U.S. Pat. No. 3,624,631, in which a fusible link is in series with an inductor and burned out by means of a high powered radio frequency transmitter. The resonant circuit is interrogated by a swept radio frequency, the presence of this circuit in the controlled area causing energy absorption at the resonant frequency which is detected by a receiver for subsequent alarm actuation. Upon application of a swept frequency of higher energy than that employed for detection, the fusible link of the resonant circuit can be destroyed to deactivate the tuned circuit such that no detection is possible. Deactivation must be accomplished by a swept frequency transmitter operating at sufficiently low radiation levels to meet the requirements of the Federal Communications Commission, and thus, the fusible link must be extremely small and made of a material to allow fusing at low power levels. The small fusible link has a high resistance which appears in series with the inductor of the resonant circuit. This series resistance reduces the Q of the resonant circuit and thus reduces the sensitivity of the circuit to be detected. The current level at which the fusible link melts is determined by the geometry of the link as well as the heat conduction properties of the materials surrounding the fusible link. Thus, the fusing current is greatly affected by the material which cover and support the fusible link.

Another electronic security system is shown in U.S. Pat. No. 3,810,147 of the same inventor as the present invention, in which a resonant circuit is employed having two distinct frequencies, one for detection and one for deactivation. A small fusible link is employed in the deactivation circuit which also includes a second capacitor to provide the distinct deactivation resonant frequency.

The resonant circuit can have a resonant frequency which will vary within a range due to manufacturing tolerances. The deactivation frequency is at a fixed frequency, and thus the resonant circuit may not be tuned exactly to the fixed deactivation frequency. The series impedance of the inductor and capacitor at the intended deactivation frequency must be as small as possible in order to permit the maximum current to flow through the fusible link to cause burnout of the link. Therefore, the capacitor should have a value as large as possible, and the inductor, a value as small as possible. In actual construction, the inductor is formed as a single turn, and the capacitor is formed of plates as large as possible consistent with the economic and physical limitations of the particular tag circuit. The size of the capacitor increases the cost and size of the overall resonant circuit.

SUMMARY OF THE INVENTION

The present invention provides a resonant tag circuit having at least one resonant frequency and operative in an electronic security system in which the tag circuit is sensed and electronically deactivated to destroy or alter the resonant characteristics of the tag circuit at the detection frequency. The resonant tag circuit is electronically deactivated by a breakdown mechanism operative within the resonant structure of the tag without need for a fusible link and without affect or reduction in the Q of the resonant circuit. The resonant tag circuit is of planar form having a flat spiral formed on a surface of a thin plastic substrate film and at least one capacitor formed by capacitor plates on respective opposite surfaces of the substrate. Energy is coupled to the tag circuit at or near the resonant frequency to cause electrical breakdown through the substrate film between the capacitor plates. The resonant structure includes means to insure that breakdown will almost always occur in a predetermined region between the capacitor plates. In response to applied energy of sufficient magnitude, an electric arc is formed through the substrate film to cause vaporization of a surrounding or adjacent conductive area to thereby destroy the resonant properties of the circuit. Alternatively, the electrical breakdown through the substrate film can cause formation of a plasma and deposition of metal between the capacitor plates along the discharge path, thereby to form a permanent short circuit between the capacitor plates which destroys the resonant properties of the circuit.

DESCRIPTION OF THE DRAWINGS

The invention will be more fully understood from the following detailed description taken in conjunction with the accompanying drawings, in which.

DETAILED DESCRIPTION OF THE INVENTION

Figure 1:
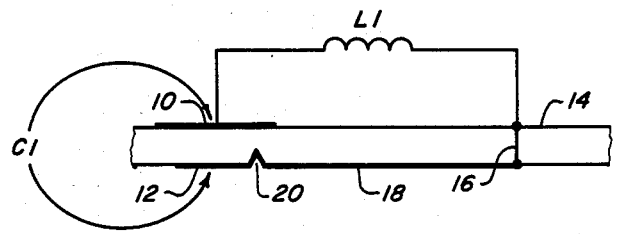
FIG. 1 is a schematic diagram of a resonant tag circuit embodying the invention.

Referring to FIG. 1, there is shown in schematic form a resonant tag circuit which includes a capacitor C1 formed of capacitor plates 10 and 12 on respective opposite surfaces of a substrate 14 which is of a dielectric or electrically insulative material, and an inductor L1 in series with the capacitor to provide a single resonant frequency. The inductor is connected at one end to capacitor plate 10, and has the other end connected to an electrical path 16 through the substrate 14 which is connected to the capacitor plate 12 via a conductive path 18. The inductor and capacitor plate 10 are integrally formed on one surface of the substrate. Typically, the inductor is formed as a flat, rectangular spiral on the substrate surface. Similarly, the capacitor plate 12 and associated connecting path are integrally formed on the opposite substrate surface. The planar tag construction will be described below.

A portion 20 of the conductive path 18 which confronts the capacitor plate 10 is indented or otherwise formed to be spaced from the capacitor plate 10 by a distance which is less than the distance between the plates 10 and 12. When sufficient electrical energy is coupled to the tag circuit at or near the resonant frequency of the circuit, the voltage across the capacitor plates 10 and 12 increases until electrical breakdown occurs at the burnout provided by the indented portion 20 of the conductive path. Since this portion provides the shortest distance between the capacitor plates, electrical breakdown always occurs at this point. The electric arc formed at breakdown is sustained by the energy which is being continuously coupled to the resonant circuit by an external power source. The electric arc vaporizes metal in the vicinity of the breakdown region 20 which destroys the conductive path 18, thereby permanently destroying the resonant characteristics of the tag circuit.

Figure 2:
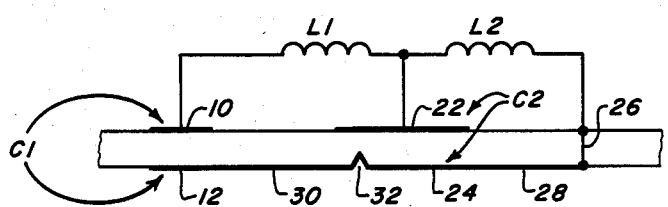
FIG. 2 is a schematic diagram of a dual frequency resonant tag circuit embodying the invention.

An alternative embodiment of the resonant tag circuit is illustrated schematically in FIG. 2 in which the tag circuit exhibits two resonant frequencies. In addition to the capacitor C1 formed by plates 10 and 12 and inductor L1, the circuit of FIG. 2 includes a second capacitor C2 formed by plates 22 and 24 and an inductor L2. The junction of the inductors L1 and L2 is connected to the capacitor plate 22. The other end of inductor L2 is connected to a through connection 26 in the substrate and which is connected through a conductive path 28 to the capacitor plate 24. A conductive path 30 interconnects the capacitor plates 24 and 12, and this conductive path includes an indented burnout portion 32 provided in confronting relation to the capacitor plate 22.

One resonant frequency is employed for detection of the tag by an associated electronic security system, and the other resonant frequency is employed for deactivation of the tag. Usually the deactivation frequency is selected to be one of the frequencies allocated by the Federal Communications Commission (FCC) to be in the industrial, scientific and medical (ISM) band so that the radiated energy for tag deactivation can be at relatively high power without special federal license. The detection frequency is usually chosen to be in one of the frequency bands allocated for field disturbance sensors. A detection frequency of 8.2 MHz is typical.

The capacitor C2 and inductor L2 are the primary components which form a resonant tunned circuit at the deactivation frequency, while the inductor L1 in conjunction with the capacitor C1 are the primary components which form a resonant tuned circuit at the detection frequency. Due to mutual coupling, all the components interact to provide the exact detection and deactivation frequencies. When sufficient energy is coupled to the circuit at the deactivation frequency, the voltage increases across the capacitor plates 22 and 24 until the substrate film breaks down at the burnout point 32. Again, breakdown always occurs at the burnout point, since this point or region 32 provides the shortest distance between the capacitor plates 22 and 24. The electric arc provided upon breakdown is sustained by the energy being coupled to the resonant circuit from the external power source and this arc causes vaporization of metal in the vicinity of the breakdown region, including the adjacent portion of conductive path 30. When the external energy is discontinued, the electric arc is extinguished. The resonant properties of the tag at the detection frequency are permanently destroyed since there is no longer an electrical connection between capacitor plate 24 and capacitor plate 12.

The resonant circuits of FIGS. 1 and 2 do not require the use of a small narrow fuse and there is thus no additional resistance placed in series with the inductor and capacitor elements of the circuit. There is, therefore, no degradation of the Q of the resonant circuit. Moreover, since the electric arc occurs between the capacitor plates and not on the surface, the materials which cover or are in contact with the surface of the capacitor plates do not significantly affect the ability of the electric arc to vaporize the metal in the vicinity of the arc. In order to maximize the voltage developed across the capacitor plates 22 and 24, the capacitance of capacitor C2 should be as small as possible and the inductance of inductor L2 should be as large as possible to provide resonance at the intended deactivation frequency. The capacitor C2 can be made quite small physically and will not significantly increase the overall size and cost of the dual frequency tag circuit of FIG. 2.

Figure 3:
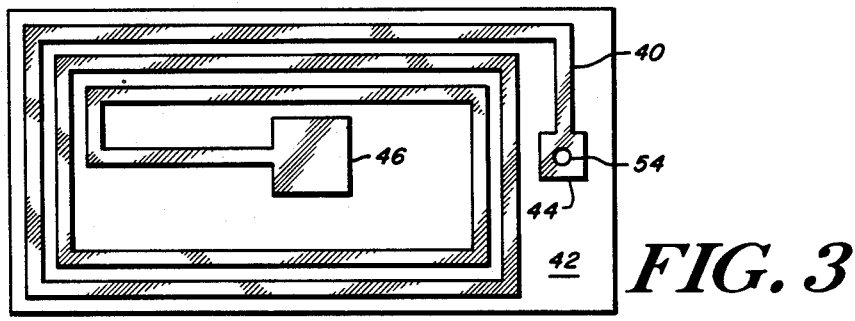
FIGS. 3 and 4 are pictorial views of respective sides of the resonant tag circuit of FIG. 1.
Figure 4:
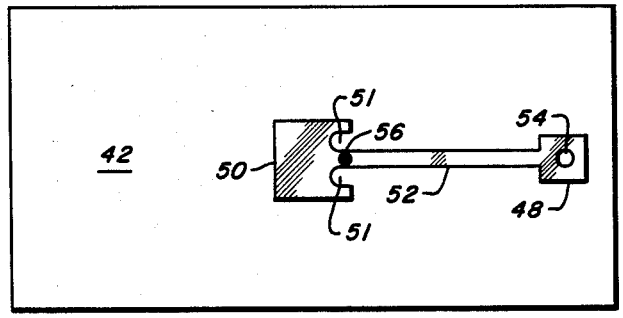

The resonant tag circuit of FIG. 1 is illustrated in typical construction in FIGS. 3 and 4 which respectively depict the opposite planar surfaces of the tag. Referring to FIG. 3, the inductor L1 is formed as a flat spiral 40 on the surface of the thin plastic film substrate 42. The plastic film serves as the dielectric of the parallel plate capacitor as well as the supporting substrate for the circuit. The spiral path extends between an outer conductive area 44 and an inner conductive area 46. The inner conductive area 46 serves as capacitor plate 10. On the opposite surface of the tag, as shown in FIG. 4, conductive areas 48 and 50 are in alignment with the respective conductive areas 44 and 46, and are interconnected by a conductive path 52. The conductive area 50 serves as the capacitor plate 12 and thus capacitor C1 is provided by the confronting conductive areas 46 and 50. A conductive interconnection 54 couples conductive areas 44 and 48 together to complete the circuit. The conductive area 50 includes recesses 51 adjacent to the area of joinder between the conductive area 50 and the conductive path 52. This area includes an indented portion 56 to provide a conductive area of the path 52 which confronts the conductive area 46 and which is more closely spaced thereto than the spacing between the conductive areas 46 and 50. This indentation 56 provides the burnout point at which electrical breakdown will occur in response to the application of energy from an external source at the resonant frequency of the tag circuit and of sufficient power to cause breakdown.

Figure 5:
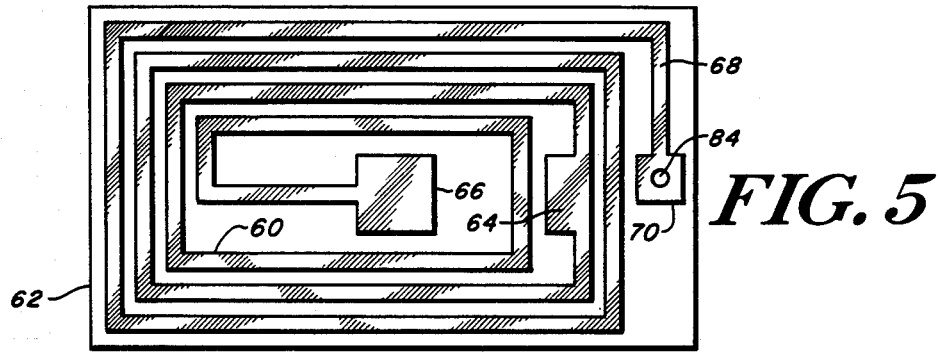
FIGS. 5 and 6 are pictorial views of respective sides of the resonant tag circuit of FIG. 2.
Figure 6:
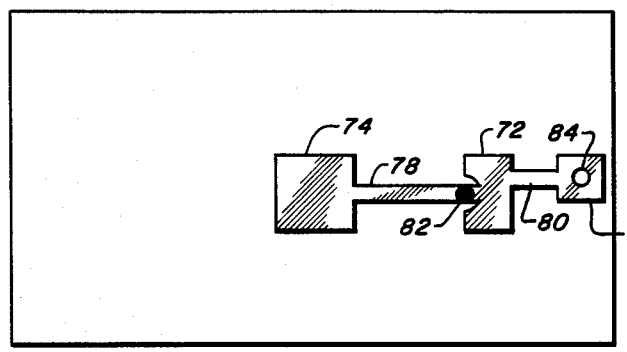

The dual frequency tag circuit of FIG. 2 is shown in typical construction in FIGS. 5 and 6 which depict the respective opposite planar surfaces of the tag. The inductor L1 is formed by a flat spiral 60 on the surface of the plastic film 62, this spiral extending between conductive areas 64 and 66. The conductor L2 is formed by a flat spiral 68 on the film surface and which extends between conductive area 64 and conductive area 70. On the opposite surface of the film substrate, shown in FIG. 6, conductive areas 72, 74, and 76 are provided in alignment with the respective conductive areas 64, 66, and 70 on the other substrate surface. The conductive areas 72 and 74 are interconnected by a conductive path 78, while the conductive areas 72 and 76 are connected by a conductive path 80. A burnout point is provided in the conductive path 78 by indentation of a portion 82 of the path confronting the conductive area 64. The capacitor C1 of FIG. 2 is provided by the conductive areas 66 and 74, while the capacitor C2 is provided by the conductive areas 64 and 72. A conductive interconnection 84 between the conductive areas 70 and 76 is provided through the substrate film to complete the circuit. The circuit is operative in the manner described to cause destruction of the resonant properties of the tag circuit at the detection frequency by burnout or vaporization of the conductive path near the burnout point 82 in response to an electric arc.

The resonant tags described herein are similar to those of U.S. Pat. No. 3,810,147 of the inventor hereof. Construction of the tag circuits is preferably according to the planar circuit fabrication process which is the subject of U.S. Pat. No. 3,913,219 of the inventor hereof.

Figure 7:
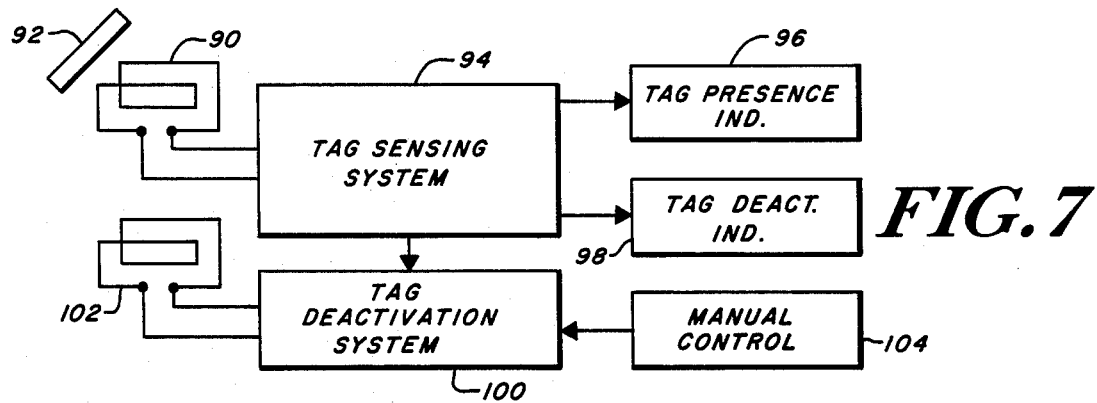
FIG. 7 is a block diagram of an electronic security system employing the invention.

Apparatus is shown in FIG. 7 for use in deactivating the resonant properties of the tag circuits described above. This apparatus includes an antenna 90 operative to sense the presence of a resonant tag circuit 92 and coupled to a tag sensing system 94 which provides an output signal to a tag presence indicator 96 and a tag deactivation indicator 98. The tag sensing system 94 also provides a control signal to a tag deactivation system 100 which includes an antenna 102. The tag deactivation system can also be manually activated by manual control 104. Upon sensing the presence of the tag circuit 92, the tag sensing system 94 is operative to trigger the deactivation system 100 to cause radiation by antenna 102 of radiation at the resonant frequency of the tag circuit and of sufficient power level to cause electrical breakdown at the breakdown point of the tag circuit and formation of an electric arc. In the case of a dual frequency tag which is being detected, the deactivation system provides energy at the deactivation frequency of that tag. Visual or other indications can be provided by indicators 96 and 98 of the presence and deactivation of the tag.

If a tag circuit is a single resonant circuit as shown in FIG. 1, the tag sensing system 94 is operative to determine the resonant frequency of the particular tag 92 which is sensed, and to provide a control signal to the deactivation system 100 representative of the measured resonant tag frequency. In response to the control signal, the deactivation system will provide radiation at this resonant frequency, and efficient coupling to the tag circuit for destruction of its resonant properties. The tag sensing system 94 can include the apparatus shown in FIG. 13 to determine the approximate resonant frequency of the tag circuit. A voltage controlled oscillator 150 drives the tag sensing antenna 90, the oscillator being controlled by the output of a microcomputer 152 by way of a digital-to-analog converter 154. The microcomputer stores digital values which after conversion to analog form by converter 154, drive oscillator 150 to produce a stepwise frequency sweep. The antenna signal is applied to an analog-to-digital converter 156, the digital output of which is applied to the microcomputer 152 which stores such outputs.

Figure 13:
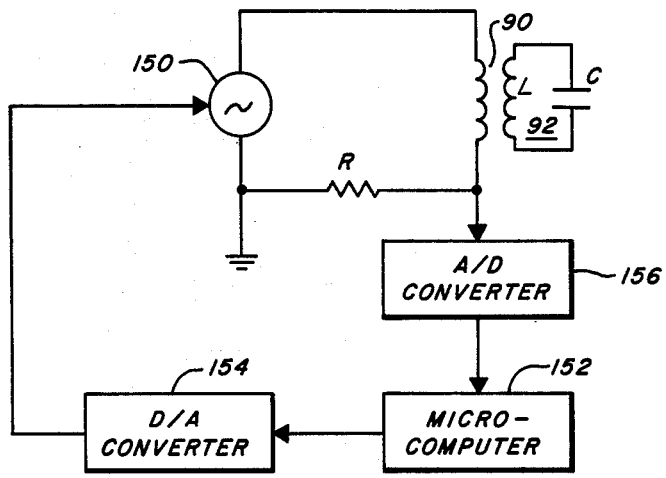
FIG. 13 is a schematic diagram of electronic apparatus for determining the resonant frequency of a tag circuit to be deactivated.
Figure 14:
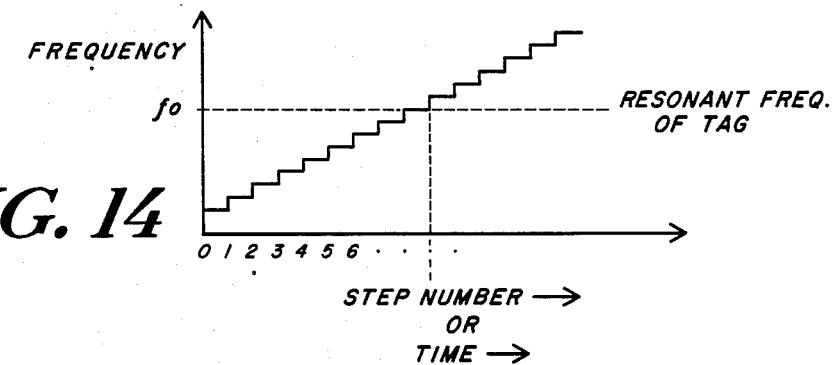
FIGS. 14 and 15 are waveforms useful in illustrating the operation of the apparatus of FIG. 13.
Figure 15:
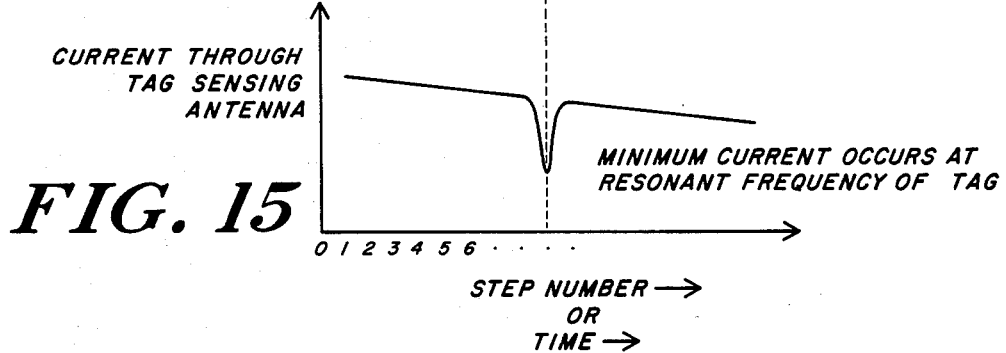

The operation of the apparatus of FIG. 13 will be explained in conjunction with the waveforms of FIGS. 14 and 15. The output of the voltage controlled oscillator 150 is shown in FIG. 14 and comprises frequency steps, each step occurring for a corresponding time interval or step number. FIG. 15 illustrates the current through the antenna 90 in relation to time. With no resonant circuit present, the current through the antenna decreases as the frequency of the oscillator increases, as illustrated by the straight line portion of the waveform of FIG. 15. With a resonant circuit 92 present near the antenna 90, the impedance of the resonant circuit will be reflected into the antenna and cause an abrupt reduction in antenna current as illustrated in FIG. 15. The current through the antenna is converted to digital values by converter 156, and these digital values are stored in the memory of microcomputer 152. The step number which corresponds to the minimum value of the stored current values corresponds to the approximate resonant frequency of the tag circuit. The stored digital value representing the resonant frequency is converted to an analog signal for control of oscillator 150 to provide an output at the resonant frequency for actuation of deactivation system 100 (FIG. 7) for destruction of the resonant properties of the tag circuit 92.

The deactivation energy is applied for a predetermined period of time determined in accordance with the time intended for tag deactivation. After deactivation, the tag sensing system 94 is operative to sense tag presence, and if the tag has been deactivated, the indicator 98 will be energized to denote that deactivation has occurred. If the tag 92 is still operative at its resonant frequency as sensed by system 94, the deactivation system 100 will again be triggered for another deactivation cycle. The deactivation cycle will be repeated a predetermined number of times until deactivation occurs. If deactivation has not occurred after a predetermined number of cycles, an annunciator can be enabled to denote to the operator that the particular tag has not been deactivated. The operator can then manually actuate the deactivation system for deactivation of the tag or take other action to deactivate or destroy the tag.

Alternatively, the tag sensing system 94, upon detection of a resonant tag circuit 92, can cause the deactivation system 100 to drive antenna 102 with a relatively high power signal that is slowly swept in frequency through the resonant frequency of the tag 92. The apparatus can be operative to alternately sense tag presence and activate the deactivation field in a cyclic manner until the tag is deactivated. Again, an operator can be notified by appropriate annunciation in the event that a particular tag has not been deactivated.

In the event that a dual frequency tag circuit is employed, the tag sensing system 94 is operative to detect the resonant detection frequency of the tag, while the deactivation system 100 is operative to provide energy at the resonant deactivation frequency of the tag. Apparatus suitable for deactivation and sensing of the two frequency tag is described in patent 3,938,044 of the same inventor as herein.

Figure 8:
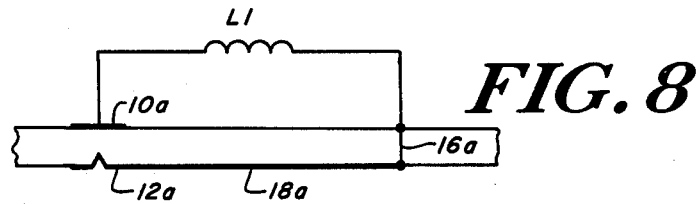
FIG. 8 is a schematic diagram of an alternative embodiment of a single frequency resonant tag circuit.
Figure 9:
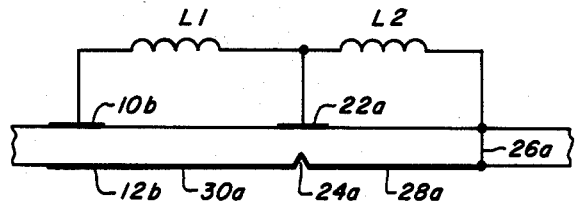
FIG. 9 is a schematic diagram of an alternative embodiment of a dual frequency resonant tag circuit.

Resonant circuits of alternative construction are shown in FIGS. 8 and 9 and which will be recognized as being similr to the respective circuits of FIGS. 1 and 2. In the embodiments of FIGS. 8 and 9, an indentation is made at any selected point or multiple points on one or both of the capacitor plates to reduce the thickness of the dielectric film at this indentation, and thereby reduce the voltage required to cause an arc across the capacitor plates. In the embodiment of FIG. 8, the indentation is shown in the capacitor plate 12a. In the embodiment of FIG. 9, the indentation is shown in the capacitor plate 24a. Upon application of energy at the resonant frequency of the tag of sufficient magnitude, electrical breakdown occurs through the dielectric film at the indentation point, and since energy is being applied to the tag, the arc tends to be sustained and forms a plasma between the capacitor plates. By reason of the Q of the resonant circuit, very little energy is dissipated in the resonant circuit itself, and the energy is dissipated in the arc formed between the plates. The energy of the arc rapidly heats the plasma and causes vaporization of the metal which forms the capacitor plates. The vaporized metal causes the arc to become conductive and short circuit the capacitor plates, which temporarily destroys the resonant properties of the circuit and causes current through the arc and voltage across the arc to rapidly collapse. The arc therefore cools and causes deposition of the previously vaporized metal between the capacitor plates.

Figure 10:
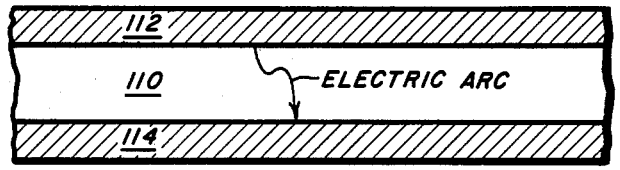
FIGS. 10, 11, and 12 are diagrammatic representations of the electrical breakdown mechanism employed in the invention.
Figure 11:
Figure 12:
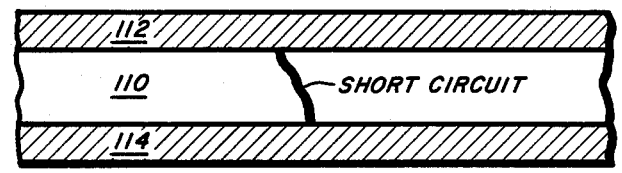

If a short circuit is formed, the tag is permanently destroyed. If a short circuit is not formed, the voltage again builds up across the capacitor plates in response to the applied energy, and the process is repeated. Since the plastic film has already been ruptured and weakened at the breakdown point, the arc will normally form again at the same point, and additional metal will be vaporized and deposited until a permanent short circuit occurs. The deactivation sequence is illustrated in FIGS. 10-12. In FIG. 10 there is shown the commencement of a voltage breakdown through the plastic film 110 and between the plates 112 and 114. Formation of the plasma after arc discharge is shown in FIG. 11, and the final deposition of metal along the discharge path to short circuit the capacitor plates is depicted in FIG. 12.

If the deactivation power is too high, it is possible to burn off a portion of the capacitor plate without forming a short circuit across the plates. This will cause slight change of the resonant frequency at each arc build-up and collapse until the arc can no longer form, although the tag will still exhibit a resonant frequency. The deactivation power should be accurately controlled, or the deactivation process electronically monitored to turn off the deactivator shortly after the first arc has formed. The deactivator can be re-energized on a cyclic basis as described until a permanent short circuit has developed across the capacitor plates. Since the deactivator antenna is coupled to the tag circuit, the impedance of the tag circuit is reflected back into the deactivation antenna. Upon formation of an arc, the impedance of the resonant circuit abruptly changes, and this change is reflected directly back into the deactivation antenna and can be detected by the deactivation system and employed for accurate control of the deactivation system. Thus, upon detection of an abrupt change in the deactivation antenna current caused by impedance change in the resonant tag circuit in response to an arc breakdown, the deactivation system can be turned off and cyclically reapplied to cause arc formation and deposition of metal along the discharge path between the capacitor plates to provide in a controlled manner deactivation of the resonant properties of the tag circuit.

Figure 16:
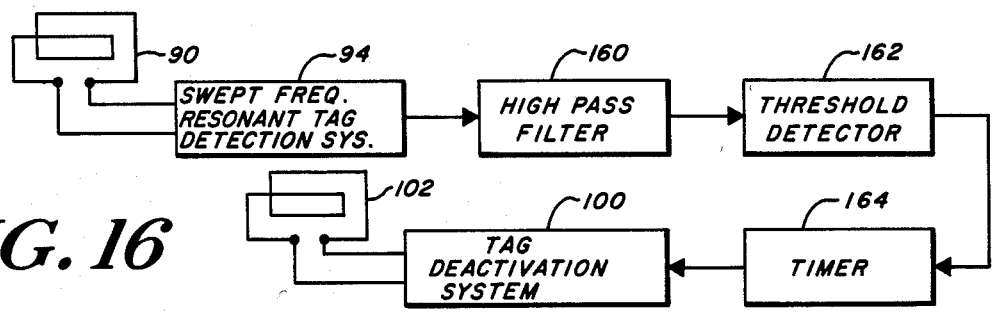
FIG. 16 is a block diagram of an electronic deactivator providing deactivation energy for a controlled interval.

The deactivation system 100 can be controlled in the manner illustrated in FIG. 16. The tag sensing system 94 provides a tag signal in response to the swept radio frequency signal passing through the resonant frequency of the tag circuit, and this tag signal is applied to a sharp cutoff high pass filter 160. The filter 160 filters out the modulation components and substantially all components of the tag signal spectrum. When an arc is formed across the capacitor plates, a relatively large and abrupt change in the current through the antenna 90 results, and this signal will pass through the high pass filter 160 to a threshold detector 162, which triggers a timer 164 which determines the time interval during which the tag deactivation system 100 operates. The operating cycle may be repeated as necessary to deactivate the resonant properties of the tag circuit.

The invention is not to be limited by what has been particularly shown and described except as indicated in the appended claims.

What is claimed is:

1. For use in an electronic security system which includes means for providing in a controlled area an electromagnetic filed of a frequency which is swept within a predetermined range and means for detecting the presence of a resonant tag circuit having a resonant frequency within said range, a resonant tag circuit comprising:
   a planar substrate of dielectric material;
   a tuned circuit on said substrate in planar circuit configuration and resonant at said frequency;
   said tuned circuit having a pair of conductive areas in alignment on respective opposite surfaces of the substrate to define a capacitor of the tuned circuit;
   means within the conductive areas defining a path between the conductive areas and through the substrate at which an arc discharge will preferentially occur in response to an electromagnetic field at said frequency of sufficient energy, and operative to destroy the resonant properties of the tuned circuit.

2. The invention of claim 1 wherein said means includes an indented portion on at least one of the conductive areas providing a spacing between the conductive areas at the indented portion which is less than the spacing between the conductive areas outside of the indented portion.

3. The invention of claim 1 wherein the arc discharge causes burnout of a conductive path to one of the conductive areas to destroy the resonant properties of the tuned circuit at said frequency.

4. The invention of claim 1 wherein the arc discharge causes a short circuit along the path between the conductive areas to destroy the resonant properties of the tuned circuit at said frequency.

5. The invention of claim 1 wherein said resonant tag circuit includes:
 a second tuned circuit on said substrate in planar circuit configuration and resonant at a second frequency outside of said predetermined range;
 said means being operative to destroy the resonant properties of the tuned circuit at said frequency within said range.

6. For use in an electronic security system which includes means for providing in a controlled area an electromagnetic field of a frequency which is swept within a predetermined range, means for detecting the presence of a resonant tag circuit having a resonant frequency within said range, and means for providing an electromagnetic field at said frequency within said range, a resonant tag circuit comprising:
 a planar substrate of dielectric material;
 a tuned circuit on said substrate in planar circuit configuration and resonant at said frequency;
 said tuned circuit having a pair of conductive areas in alignment on respective opposite surfaces of the substrate to define a capacitor of the tuned circuit;
 means within the conductive areas defining a path between the conductive areas and through the substrate at which an arc discharge will preferentially occur in response to an electromagnetic field at said frequency of sufficient energy, and operative to destroy the resonant properties of the tuned circuit.

7. For use in an electronic security system which includes means for providing in a controlled area an electromagnetic field of a frequency which is swept within a predetermined range and means for detecting the presence of a resonant tag circuit having a first resonant frequency within said range and a second resonant frequency outside of said range, a multi-frequency resonant tag circuit comprising:
 a planar substrate of electrically insulative material;
 a first conductive path formed on a surface of said substrate in a configuration to define a first inductor;
 a second conductive path formed on said substrate in a configuration to define a second inductor;
 a plurality of pairs of conductive areas, each pair formed of conductive areas in alignment on respective opposite surfaces of said substrate, the conductive areas being electrically connected to the conductive paths at selected points to define a plurality of capacitors for said tag circuit; and
 means within one of the pairs of conductive areas defining a path between those conductive areas and through the substrate at which an arc discharge will preferentially occur in response to an electromagnetic field at said second frequency of sufficient energy, and operative to destroy the resonant properties of the tuned circuit at said first frequency.

8. For use in an electronic security system which includes means for providing in a controlled area an electromagnetic field of a frequency which is swept within a predetermined range, means for detecting the presence of a resonant tag circuit having a first resonant frequency within said range and a second resonant frequency outside of said range, and means for providing an electromagnetic field at the second frequency outside of said range, a multi-frequency resonant tag circuit comprising:
 a planar substrate of electrically insulative material;
 a first conductive path formed on a surface of said substrate in a configuration to define a first inductor;
 a second conductive path formed on said substrate in a configuration to define a second inductor;
 a plurality of pairs of conductive areas, each pair formed of conductive areas in alignment on respective opposite surfaces of said substrate, the conductive areas being electrically connected to the conductive paths at selected points to define a plurality of capacitors for said tag circuit; and
 means within one of the pairs of conductive areas defining a path between those conductive areas and through the substrate at which an arc discharge will preferentially occur in response to an electromagnetic field at said second frequency of sufficient energy, and operative to destroy the resonant properties of the tuned circuit at said first frequency.

9. For use in an electronic security system which includes means for providing in a controlled area an electromagnetic field of a frequency which is swept within a predetermined range and means for detecting the presence of a resonant tag circuit having a resonant frequency within said range, a resonant tag circuit comprising:
 a planar substrate of electrically insulative material;
 a first conductive path formed on a surface of said substrate in a configuration to define an inductor;
 a pair of conductive areas on said substrate in alignment on respective opposite surface of said substrate to define a capacitor, the conductive areas being electrically connected to said paths at selected points to define a tuned circuit; and
 means within the conductive areas defining a path between the conductive areas and through the substrate at which an arc discharge will preferentially occur in response to an electromagnetic field at said frequency of sufficient energy, and operative to destroy the resonant properties of the tuned circuit.

10. For use in an electronic security system which includes means for providing in a controlled area an electromagnetic field of a frequency which is swept within a predetermined range, means for detecting the presence of a resonant tag circuit having a resonant frequency within said range, and means for providing an electromagnetic field at said frequency within said range, a resonant tag circuit comprising:
 a planar substrate of electrically insulative material;
 a first conductive path formed on a surface of said substrate in a configuration to define an inductor;
 a pair of conductive areas on said substrate in alignment on respective opposite surface of said substrate to define a capacitor, the conductive areas being electrically connected to said paths at selected points to define a tuned circuit; and
 means within the conductive areas defining a path between the conductive areas and through the substrate at which an arc discharge will preferentially occur in response to an electromagnetic field at said frequency of sufficient energy, and operative to destroy the resonant properties of the tuned circuit.

11. For use in an electronic security system which includes means for providing in a controlled area an electromagnetic field of a frequency which is swept within a predetermined range, means for detecting the presence of a resonant tag circuit having capacitor plates on respective sides of a substrate of dielectric material and having a resonant frequency within said range, and means for providing an electromagnetic field at said frequency within said range to cause deactivation of the resonant properties of the resonant tag circuit, a method of electronic tag deactivation comprising the steps of:

providing an electromagnetic field at the resonant frequency sufficient to cause a voltage breakdown between the capacitor plates and through the dielectric substrate material;

continuing to apply the electromagnetic field to cause formation of an arc between the capacitor plates and vaporization of the metal of the capacitor plates, the vaporized metal causing the arc to become conductive, thereby to short circuit the capacitor plates;

causing the arc to cool and deposit the vaporized metal along the discharge path to provide a short circuit between the capacitor plates;

repeating the foregoing steps until a permanent short circuit occurs by deposition of a conductive connection between the capacitor plates along the arc discharge path.

12. For use in an electronic security system which includes means for providing in a controlled area an electromagnetic field of a frequency which is swept within a predetermined range and means for detecting the presence of a resonant tag circuit having a first resonant frequency within said range and a second resonant frequency outside of said range, a multi-frequency resonant tag circuit comprising:

a planar insulative substrate having formed on one surface thereof:

a first conductive area centrally formed on said substrate surface;

second and third conductive areas formed in adjacent spaced relation along one side of said substrate surface;

a first conductive path arranged on said substrate surface between and in electrical connection with said first and second conductive areas;

a second conductive path formed on said substrate surface between and in electrical connection with said second and third conductive areas;

and wherein the opposite surface of said substrate includes:

fourth, fifth, and sixth conductive areas each in alignment and substantially coextensive with said respective first, second, and third conductive areas formed on said one substrate surface;

a conductive path connecting said fourth and fifth conductive areas;

said first and second conductive paths and plurality of conductive areas comprising said first and second tuned circuits; and means within one of the pairs of conductive areas defining a path between those conductive areas and through the substrate at which an arc discharge will preferentially occur in response to an electromagnetic field at said second frequency of sufficient energy, and operative to destroy the resonant properties of the tuned circuit at said first frequency.

13. For use in an electronic security system which includes means for providing in a controlled area an electromagnetic field of a frequency which is swept within a predetermined range, means for detecting the presence of a resonant tag circuit having a first resonant frequency within said range and a second resonant frequency outside of said range, and means for providing an electromagnetic field at the second frequency outside of said range, a multi-frequency resonant tag circuit comprising:

a planar insulative substrate having formed on one surface thereof:

a first conductive area centrally formed on said substrate surface;

second and third conductive areas formed in adjacent spaced relation along one side of said substrate surface;

a first conductive path arranged on said substrate surface between and in electrical connection with said first and second conductive areas;

a second conductive path formed on said substrate surface between and in electrical connection with said second and third conductive areas;

and wherein the opposite surface of said substrate includes:

fourth, fifth, and sixth conductive areas each in alignment and substantially coextensive with said respective first, second, and third conductive areas formed on said one substrate surface;

a conductive path connecting said fourth and fifth conductive areas;

said first and second conductive paths and plurality of conductive areas comprising said first and second tuned circuits; and means within one of the pairs of conductive areas defining a path between those conductive areas and through the substrate at which an arc discharge will preferentially occur in response to an electromagnetic field at said second frequency of sufficient energy, and operative to destroy the resonant properties of the tuned circuit at said first frequency.

14. An electronic security system for detection of a resonant tag circuit having capacitor plates on respective sides of a substrate, and for electronic deactivation of the resonant characteristics of the tag circuit, comprising:

means for providing an electromagnetic field of frequency which is swept within a predetermined range;

means for detecting a resonant frequency of the tag circuit within said range; and deactivator means operative upon detection of the presence of the resonant tag circuit to provide an electromagnetic field at said resonant frequency of sufficient energy to cause an arc discharge across the capacitor plates and through the substrate of the tag circuit, and operative to destroy the resonant properties of the tag circuit.

15. The system of claim 14 wherein the deactivator means is operative to cause a short circuit between the capacitor plates to destroy the resonant properties of the tag circuit.

16. The system of claim 14 wherein the deactivator means is operative to cause vaporization of a conductive area of the tag circuit to destroy the resonant properties thereof.

17. The system of claim 14 including:

means for indicating the presence of a resonant tag circuit to be detected; and means for indicating the deactivation of the resonant properties of the tag circuit.

18. The system of claim 14 wherein the means for providing an electromagnetic field includes:
a voltage-controlled oscillator driving a tag sensing antenna;
an analog-to-digital converter coupled to the antenna and operative to provide digital representations of current through the antenna;
means for monitoring said digital representations;
means for controlling the oscillator to provide a stepwise frequency sweep for providing said field which is swept within a predetermined range; and
means for determining the digital value corresponding to the resonant frequency of the tag circuit and operative to cause actuation of the deactivator means.

19. The system of claim 14 wherein the deactivator means includes:
means for detecting an arc discharge across the capacitor plates of the resonant tag circuit, and for providing a signal representative thereof; and
means operative in response to said signal for determining the time interval during which the deactivator means operates.

20. A resonant tag circuit comprising:
a planar substrate of dielectric material;
a tuned circuit on said substrate in planar circuit configuration and resonant at a frequency within a predetermined range;
said tuned circuit having a pair of conductive areas in alignment on respective opposite surfaces of the substrate to define a capacitor of the tuned circuit;
means within the conductive areas defining a path between the conductive areas and through the substrate at which an arc discharge will preferentially occur in response to an electromagnetic field at said frequency of sufficient energy, and operative to destroy the resonant properties of the tuned circuit.

21. The invention of claim 20 wherein said means includes an indented portion on at least one of the conductive areas providing a spacing between the conductive areas at the indented portion which is less than the spacing between the conductive areas outside of the indented portion.

22. The invention of claim 20 wherein the arc discharge causes burnout of a conductive path to one of the conductive areas to destroy the resonant properties of the tuned circuit at said frequency.

23. The invention of claim 20 wherein the arc discharge causes a short circuit along the path between the conductive areas to destroy the resonant properties of the tuned circuit at said frequency.

24. A multi-frequency resonant tag circuit comprising:
a planar substrate of electrically insulative material;
a first conductive path formed on a surface of said substrate in a configuration to define a first inductor;
a second conductive path formed on said substrate in a configuration to define a second inductor;
a plurality of pairs of conductive areas, each pair formed of conductive areas in alignment on respective opposite surfaces of said substrate, the conductive areas being electrically connected to the conductive paths at selected points to define a plurality of capacitors for said tag circuit; and
means within one of the pairs of conductive areas defining a path between those conductive areas and through the substrate at which an arc discharge will preferentially occur in response to an electromagnetic field at a second frequency of sufficient energy, and operative to destroy the resonant properties of the tuned circuit at a first frequency.

25. A resonant tag circuit comprising:
a planar substrate of electrically insulative material;
a first conductive path formed on a surface of said substrate in a configuration to define an inductor;
a pair of conductive areas on said substrate in alignment on respective opposite surface of said substrate to define a capacitor, the conductive areas being electrically connected to said paths at selected points to define a tuned circuit; and
means within the conductive areas defining a path between the conductive areas and through the substrate at which an arc discharge will preferentially occur in response to an electromagnetic field of sufficient energy, and operative to destroy the resonant properties of the tuned circuit.

* * * * *